US008432405B2

(12) United States Patent
Saini et al.

(10) Patent No.: US 8,432,405 B2
(45) Date of Patent: Apr. 30, 2013

(54) DYNAMICALLY TRANSITIONING BETWEEN HARDWARE-ACCELERATED AND SOFTWARE RENDERING

(75) Inventors: Shailesh Saini, Redmond, WA (US); Steve Kihslinger, Monroe, WA (US); Cliff Owen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 12/146,482

(22) Filed: Jun. 26, 2008

(65) Prior Publication Data

US 2009/0322764 A1    Dec. 31, 2009

(51) Int. Cl.
    G06F 15/16    (2006.01)
    G06T 1/00    (2006.01)
(52) U.S. Cl.
    USPC ........................... 345/503; 345/504; 345/522
(58) Field of Classification Search ................. 345/503, 345/504, 522
    See application file for complete search history.

(56) References Cited

U.S. PATENT DOCUMENTS

| | | | |
|---|---|---|---|
| 6,326,969 B1 | 12/2001 | Helman et al. | |
| 6,388,671 B1 | 5/2002 | Yoshizawa et al. | |
| 6,882,346 B1 | 4/2005 | Lefebvre et al. | |
| 7,162,716 B2 | 1/2007 | Glanville et al. | |
| 7,230,626 B2 | 6/2007 | Hill et al. | |
| 7,286,133 B2 | 10/2007 | Kilgard et al. | |
| 7,797,435 B2* | 9/2010 | Hochmuth et al. | 709/229 |
| 2002/0093505 A1* | 7/2002 | Hill et al. | 345/543 |
| 2005/0035965 A1* | 2/2005 | Sloan et al. | 345/426 |
| 2005/0081115 A1* | 4/2005 | Cheng et al. | 714/47 |
| 2005/0140692 A1 | 6/2005 | Swedberg et al. | |
| 2006/0290703 A1 | 12/2006 | White et al. | |
| 2008/0074431 A1 | 3/2008 | Bakalash et al. | |
| 2008/0148286 A1* | 6/2008 | Hetrick | 719/318 |

FOREIGN PATENT DOCUMENTS

WO    2006109011 A2    10/2006

OTHER PUBLICATIONS

"OpenVG—The Standard for Vector Graphics Acceleration", (Retrieved Apr. 21, 2008) http://www.khronos.org/openvg/.
Jiang et al., "A Parallel Framework for Interactive Rendering of Massive Complex Scenes on PCs Cluster", 0-7695-2929-1/07, IEEE DOI 10.1109/ICIG.2007.141, 6 pages.
Pellacini et al., "Lpics: a Hybrid Hardware-Accelerated Relighting Engine for Computer Cinematography", 2005, 7 pages.

* cited by examiner

*Primary Examiner* — Hau Nguyen
(74) *Attorney, Agent, or Firm* — Tracy S Powell; Powell IP Law, PLLC (57) ABSTRACT

A variable rendering system is described that automatically transitions between hardware-accelerated rendering and software rendering of application data based on system performance and without user interaction or noticeable impact on the user experience. When hardware-accelerated rendering is available, the system renders application data using hardware-accelerated rendering. If an event occurs that causes hardware-accelerated rendering to fail, then the system dynamically transitions from hardware-accelerated rendering to software-accelerated rendering. Periodically, the system attempts to transition back to hardware-accelerated rendering.

20 Claims, 4 Drawing Sheets

DYNAMICALLY TRANSITIONING BETWEEN HARDWARE-ACCELERATED AND SOFTWARE RENDERING

BACKGROUND

It is increasingly common for applications to use 3-dimensional (3D) visual objects. For example, documents may include video, 3D art with shading and other effects, complex object motion (e.g., a presentation slide transitions), and so forth. Many applications push the limits of what can be done graphically (in real-time) within the bounds of a software constrained rendering platform. In order to take the next leap in both rendering quality and performance, applications use hardware acceleration typically provided by a graphics-processing unit (GPU). By utilizing the power of the GPU, the ceiling for what the rendering platform can accomplish rises significantly. The GPU can provide improved rendering performance, allow for higher quality rendering of current effects, and enable rendering of new types of content. Applications increasingly rely on a hardware accelerated rendering pipeline for all 2D and 3D content (i.e., text, shapes, and effects) to simplify application logic, even those that can be satisfactorily rendered without hardware acceleration. Applications also use the hardware accelerated rendering pipeline for other rendering, such as printing application data to a printer or other device.

Many operating systems provide multiple ways to access video hardware. For example, Microsoft Windows provides a high-level graphical device interface (GDI) layer and a low-level Microsoft DirectX layer. The low-level layer provides enhanced graphics capabilities but also relies strongly on the hardware. In general, the high-level layer is software accelerated (e.g., does not make substantial use of the GPU) and the low-level layer is hardware accelerated (e.g., makes substantial use of the GPU). There can be significant differences in capabilities between software and hardware acceleration, including the availability of pixel shaders, vertex shaders, and anti-aliasing.

When utilizing the Graphics Processing Unit (GPU) for rendering, it is possible that the GPU may run into errors (e.g., drivers failing, running out of memory) that cause hardware accelerated rendering to fail. 3D hardware is often not reliable, particularly on older systems. Bad drivers, limited resources, and competing demands of applications can all lead to an unreliable experience. In addition, not all computer systems have GPUs that meet the requirements for hardware-accelerated rendering. Furthermore, there are a number of scenarios where rendering through hardware does not work due to limitations of the underlying operating system or other software (e.g., when the user locks his/her computer system).

However, certain applications (such as office productivity applications) have to be able to render in all these cases: when there is sufficient hardware, when the hardware fails, and when there is insufficient hardware. Most applications today address this issue by asking the user to manually switch between hardware accelerated and software rendering. Alternatively, application writers often avoid using advanced 3D functionality to appeal to the least common denominator of hardware capabilities. This leads to applications that underutilize the available hardware at the expense of providing a richer user experience.

SUMMARY

A variable rendering system is described that automatically transitions between hardware-accelerated rendering and software rendering of application data based on system performance and without user interaction or noticeable impact on the user experience. When hardware-accelerated rendering is available, the system renders application data using hardware-accelerated rendering. If an event occurs that causes hardware-accelerated rendering to fail, then the system dynamically transitions from hardware-accelerated rendering to software-accelerated rendering. Periodically, the system attempts to transition back to hardware-accelerated rendering. The system transitions between hardware-accelerated rendering and software-accelerated rendering without interruption to the user. Thus, the user is able to continue to perform work using the application, and the application writer is able to provide a rich user experience that is robust in the face of hardware failures or other changes in capabilities of the hardware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A variable rendering system is described that automatically transitions between hardware-accelerated rendering and software rendering of application data based on system performance and without user interaction or noticeable impact on the user experience. The system initially renders application data using software-accelerated rendering until hardware-based rendering is available. For example, a hardware subsystem may be slow to initialize. When hardware-accelerated rendering is available, the system transitions to rendering application data using hardware-accelerated rendering. For example, after the hardware subsystem is initialized, the system may send rendering operations to the GPU. If an event occurs that causes hardware-accelerated rendering to fail, then the system dynamically transitions from hardware-accelerated rendering to software-accelerated rendering. For example, the GPU may fail or the user may take an action (e.g., logging on from a remote terminal) that causes the GPU to be unavailable. Periodically or based on trigger events, the system attempts to transition back to hardware-accelerated rendering. For example, if the user logs on to a local session again, then the system may test whether the GPU is available for hardware rendering. If the transition succeeds, then the system continues using hardware-accelerated rendering until another failure occurs or the application closes. The system transitions between hardware-accelerated rendering and software-accelerated rendering without interruption to the user. Thus, the user is able to continue to perform work using the application, and the application writer is able to provide a rich user experience that is robust in the face of hardware failures or other changes in capabilities of the hardware.

Figure 1:
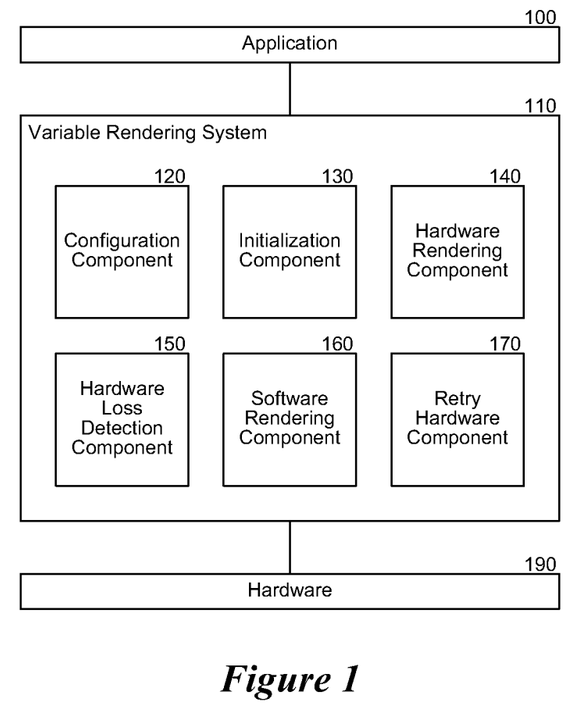
FIG. 1 is a block diagram that illustrates components of the variable rendering system and a typical operating environment, in one embodiment.

FIG. 1 is a block diagram that illustrates components of the variable rendering system and a typical operating environment, in one embodiment. An application 100 uses the variable rendering system 110 for at least some of its rendering. For example, the application 100 may use the variable rendering system 110 to render 3D shapes and other objects. In some embodiments, the application 100 may composite the resulting image with the application's software rendering engine to include the rendered image with other application content. The variable rendering system 110 performs either hardware-accelerated or software rendering and communicates with hardware 190 to render graphics for display to a user or rendering to another device, such as a printer. The hardware includes a CPU that is used for software rendering and a GPU that is used for hardware-accelerated rendering. The variable rendering system 110 includes a configuration component 120, an initialization component 130, a hardware rendering component 140, a hardware loss detection component 150, a software rendering component 160, and a retry hardware component 170. Each of these components is described in further detail herein.

The configuration component 120 manages the configuration of the system 110, including detecting whether a user has disabled hardware acceleration and determining if a computer system meets hardware requirements for satisfactorily using hardware acceleration. In some embodiments, the user can manually turn off hardware acceleration through a configuration setting, so that the variable rendering system 110 will only use software rendering. The user may modify the configuration setting while an application is running, and the variable rendering system 110 detects the change and either stops using hardware acceleration if hardware acceleration was previously enabled or attempts to use hardware acceleration if hardware acceleration was previously disabled. The configuration component 120 also determines whether the computer system on which the variable rendering system 110 is running meets hardware requirements for successfully using hardware acceleration. For example, the configuration component 120 may determine whether the computer system has a particular amount of video memory installed and available for the variable rendering system 110 to use.

The initialization component 130 initializes the hardware and software involved with hardware-accelerated rendering. For example, the initialization component 130 may invoke Microsoft DirectX Direct3D or an implementation of OpenGL to create a software representation of a device (e.g., an object), which may then issue driver calls to the device to prepare it for use. The initialization may take a long time relative to other actions performed by the application, so the variable rendering system 110 may accept software rendering calls while the initialization component 130 prepares the hardware. The initialization component 130 provides a notification when the hardware is ready so that other components of the variable rendering system 110 can use the hardware.

The hardware rendering component 140 manages hardware-accelerated rendering. The hardware rendering component 140 may use an application programming interface (API) such as the Microsoft Direct3D API to invoke software-based objects that communicate with the hardware. For example, the hardware rendering component 140 may use the API to create pixel shaders, vertex shaders, load textures and other 3D objects, and so forth.

The hardware loss detection component 150 detects errors that occur while the hardware rendering component 140 is performing hardware-accelerated rendering. Any error encountered while rendering using hardware acceleration causes the hardware loss detection component 150 to determine whether the variable rendering system 110 switches to software rendering. For example, a runtime error may occur anytime the API used by the hardware rendering component 140 returns an error. There are many reasons for encountering a runtime failure, including unsupported features, a lost device (such as when a user logs on through a remote terminal), or a hardware or driver error.

An unsupported features failure can occur if a capability that the variable rendering system 110 attempts to use is not supported by the GPU. A lost device failure can occur whenever the available hardware of the system changes, such as when the user locks the desktop (e.g., in Microsoft Windows), disables his/her video card through a device manager, invokes fast user switching, logs on through a remote terminal (e.g., to a Microsoft Windows desktop using Microsoft Terminal Services), or launches a full screen application in a mode that grants exclusive access to the hardware (e.g., Microsoft Direct3D Exclusive Mode). A hardware or driver error can occur for many reasons, including when the GPU runs out of video memory or due to errors in the driver. For example, a user may run an application on a work computer while at work, and later go home and login to the work computer through Microsoft Terminal Services to continue using the application. Hardware acceleration may not be available when working through a remote terminal, so the variable rendering system 110 may switch to software rendering when the user logs on remotely. If the user later returns to a local session of the desktop, the variable rendering system 110 may retry hardware rendering.

The software rendering component 160 is responsible for rendering that is not hardware accelerated. Although software rendering may use the same hardware devices (e.g., a video card) that hardware-accelerated rendering uses, software rendering may not have access to advanced features of the hardware, such as vector calculations of the GPU, vertex shaders, pixel shaders, and anti-aliasing. Software rendering may depend more heavily on the CPU of the computer system to calculate the movement of objects and other 3D operations. The software rendering component may use existing APIs such as the Microsoft Windows GDI and GDI+ APIs. The software rendering component 160 may provide the same functions as the hardware rendering component 140 so that other components of the variable rendering system 110 can operate similarly whether the system 110 is using software rendering or hardware rendering at a given time.

The retry hardware component 170 determines when the variable rendering system 110 attempts to switch from using software rendering to using hardware rendering. For example, after an error has occurred during hardware rendering and the system 110 has switched to software rendering, the retry hardware component 170 may periodically direct the system 110 to try hardware rendering again. It is possible that whatever problem prevented hardware rendering before (e.g., low video memory) has been remedied (e.g., by closing other applications) so that hardware rendering can succeed again.

In some embodiments, the variable rendering system 110 starts out using software rendering when an application launches. Initializing and preparing the hardware for operation may take enough time that it is desirable to go ahead and allow the user to use the application 100 before hardware rendering is ready. Thus, the system 110 starts out using software rendering, begins initializing the hardware (e.g., using a background thread), and then switches to hardware rendering when initialization is complete. For some file types or other conditions, the system 110 may wait for hardware rendering to be available before allowing the user to interact with the application. For example, .PPS files directly launch a slideshow that may use 3D objects or animation for which hardware rendering is desirable, and for these file types, the system 110 may wait for hardware rendering.

Conditions that cause the variable rendering system 110 to retry hardware rendering are sometimes referred to herein as triggers. Triggers are events or conditions that indicate logically meaningful times for retrying hardware rendering, and can include, for example, a fixed timeout, a heuristic-based period, a hardware event, a software event, or a user action. As mentioned above, a runtime failure can cause a switch from hardware to software rendering. Triggers work in the opposite direction, attempting to get the application rendering through hardware again. In order to go back to rendering through hardware after falling back to software rendering, the retry hardware component 170 may reset the current device.

In some embodiments, the variable rendering system 110 limits the frequency of triggers or attempts to reset the hardware device to improve performance of the application 100. Resetting the device is not always an expensive operation; however, re-rendering all of the content that is visible can be expensive depending on what the content includes. Thus, limiting the frequency of attempts to reset the hardware can be desirable. It is also undesirable to continually attempt to switch to hardware rendering and fail. For this reason, the system 110 may select triggers that are likely to indicate a positive change in hardware conditions that may signal that hardware rendering will succeed. Trigger frequency can be reduced either by throttling how many times the system 110 attempts to reset the hardware device via triggers or by reducing the number of triggers and the system may use both methods to achieve a satisfactory trigger frequency.

In some embodiments, the variable rendering system 110 treats the user unlocking the desktop as a trigger for retrying hardware rendering. Losing the hardware device due to the user locking the desktop is common, and the time when the user unlocks the desktop is a good point to try to restore hardware rendering. The user may lock or unlock the desktop in the middle of a rendering operation (e.g., printing a large document with 3D objects), and the variable rendering system 110 allows the application 100 to handle this event smoothly with no noticeable impact on rendering to the user, even though the system 110 may switch repeatedly between hardware and software rendering.

In some embodiments, the variable rendering system 110 treats the playback of video or starting of a slideshow or other animation as a trigger for retrying hardware rendering. The hardware rendering path may provide increased performance for video playback and slideshows with 3D transitions between slides. Accordingly, if the variable rendering system 110 is using software rendering when video playback or animation is requested, then the system 110 may attempt to retry hardware rendering at that time. Alternatively or additionally, the system 110 may attempt hardware acceleration when the user switches between slides, particularly if the slides contain many rendered objects or transitions.

In some embodiments, the variable rendering system treats a connection to a local desktop as a trigger for retrying hardware rendering. For example, a user previously logged on through a remote session where hardware rendering was not available may return to the local session where hardware rendering is available. The retry operation may include reinitializing the underlying hardware API. For example, if Microsoft DirectX is initialized in a state where a hardware device is not available (e.g., through a terminal server or when the machine is locked), then the API will still report that the device is unavailable, even after exiting that state. Thus, the retry operation may reinitialize the API so that hardware devices that have become available can be accessed through the API. Reinitialization can be a costly operation (e.g., one second), so the system may limit how often the system performs reinitialization, such as only when the API reports that no hardware devices are available rather than on any API runtime failure.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
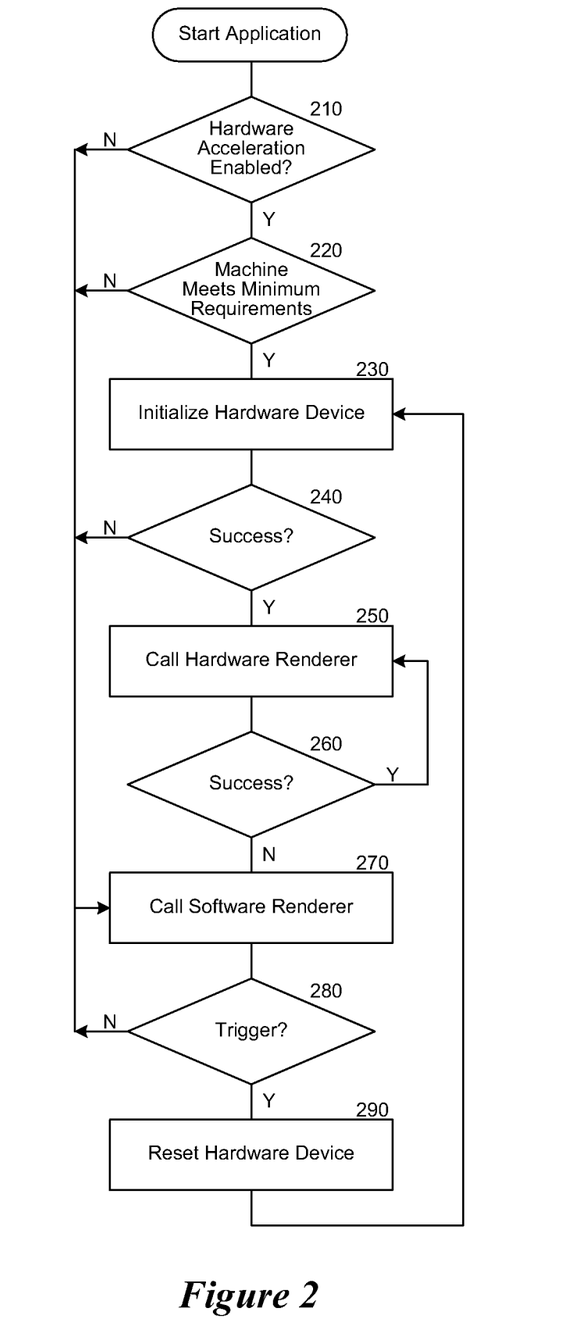
FIG. 2 is a flow diagram that illustrates the processing of the variable rendering system to handle rendering for an application, in one embodiment.

FIG. 2 is a flow diagram that illustrates the processing of the variable rendering system to handle rendering for an application, in one embodiment. These steps are typically invoked when an application using the variable rendering system starts. In decision block 210, if the system determines that hardware acceleration is enabled, then the system continues at block 220, else the system continues at block 270. For example, the user may have disabled hardware acceleration through a configuration setting, such as if the user knows that the user's computer system has a hardware or driver problem that prevents hardware acceleration from operating properly. In decision block 220, if the variable rendering system determines that the computer system meets hardware requirements for successfully using hardware rendering, then the system continues at block 230, else the system continues at block 270. For example, the variable rendering system may determine whether the computer system has a threshold amount of video memory installed and available, whether the computer system has hardware that supports a particular graphics API (e.g., Microsoft DirectX 9.0c), and so forth.

In block 230, the system initializes the hardware device(s) for hardware rendering. For example, the system may call an API to connect to the hardware device and reserve resources, such as video memory, for the application to use. In decision block 240, if the hardware initialization succeeded, then the system continues at block 250, else the system continues at block 270. For example, hardware initialization may fail if the user is connected to the computer system through a remote terminal. In block 250, the system performs a rendering operation using hardware rendering. For example, the system may render a slide of a slide presentation. In decision block 260, if the rendering operation succeeded, then the system loops to block 250 to perform the next rendering operation using hardware rendering, else the system continues at block 270. The system remains in this loop until either hardware rendering is unavailable or the application is closed.

In block 270, the system performs a rendering operation using software rendering. If a previous hardware rendering operation failed, then the system may regenerate any textures or other resources that were being used and restart the rendering operation to ensure that the rendered scene is complete. For example, hardware rendering may have failed in the middle of rendering an object, and the system may re-render the object from the start to ensure a consistent look for the object. In decision block 280, if a trigger occurs then the system continues at block 290, else the component loops to block 280 to perform the next rendering operation using software rendering. In block 290, the system resets the hardware device and prepares to try hardware rendering again. After block 290, the system loops to block 230 to initialize the hardware device. In some cases, the system may attempt to use the hardware device without performing a full reinitialization to conserve system resources. When the application closes, these steps conclude.

Figure 3:
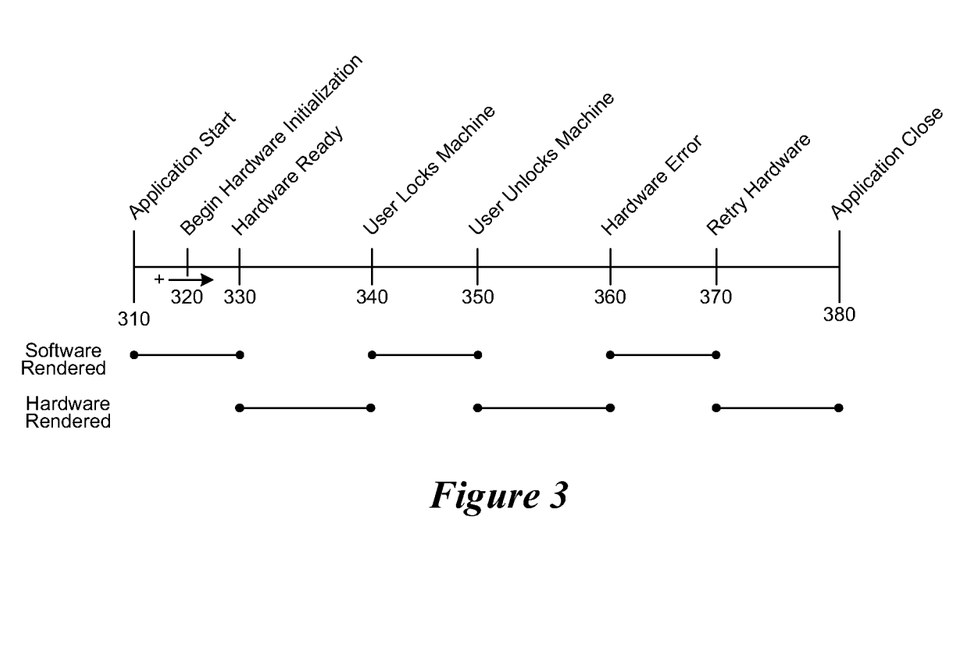
FIG. 3 is a timeline that illustrates an example series of events using the variable rendering system, in one embodiment.

FIG. 3 is a timeline that illustrates an example series of events using the variable rendering system, in one embodiment. The bars beneath the timeline indicate whether the system uses software or hardware rendering during that period. At time 310, the user invokes an application that uses the variable rendering system. The system initially uses software rendering. At time 320, the system begins initialization of hardware resources for hardware-accelerated rendering. For example, the system may initialize the device driver. At time 330, the system receives a notification that the hardware is ready, and switches to hardware rendering. At time 340, the user locks the machine causing hardware rendering to fail, and the system switches to software rendering. At time 350, the user unlocks the machine making hardware rendering available again, and the system switches to hardware rendering. At time 360, the system encounters an unexpected hardware rendering error, such as the hardware running out of memory, and the system switches to software rendering. At time 370, the system retries the hardware and determines that the cause of the previous failure has been remedied. The system switches back to hardware rendering until time 380, when the application closes. Thus, the variable rendering system may switch back and forth between software and hardware rendering without the user noticing as warranted by various events that occur, such as those shown.

It is desirable from a user experience perspective to make switches in the rendering path visually transparent to the user. For some applications, such as a word processing application or spreadsheet application, a loss of hardware rendering may not noticeably impair the user's ability to complete work using the application, because these applications often have few visual objects that benefit substantially from hardware rendering. Other applications, however, such as a presentation or video-based application, may rely heavily on hardware acceleration and show a greater disparity in performance between the hardware and software rendering paths. Some application features, such as 3D motion paths, may not function at all without hardware rendering. Nevertheless, the variable rendering system attempts to provide parity between the hardware and software rendering paths, so that although resource usage may increase during a transition from hardware to software rendering, the user's work may continue uninterrupted.

In some embodiments, the variable rendering system provides a different user experience based on the reason for switching from hardware rendering to software rendering. When the system encounters a runtime failure, the system immediately switches rendering paths in order to complete rendering. In such a case, the system re-renders the current scene to a back buffer before displaying it all at once. This ensures the rendering in the scene is consistent and the user does not see any strange behavior on the screen while the system re-renders. All other visible scenes that have already been successfully rendered are re-rendered when needed (e.g., when invalidated). In contrast, a planned switch takes place when the system attempts to switch the rendering path based on a trigger or the user logging on/unlocking their machine. When a planned switch takes place, the system can generally complete the current scene before the switch, and only re-render scenes when they become invalidated. This avoids creating a slowdown for the user by re-rendering all of the content when a planned switch takes place.

Figure 4:
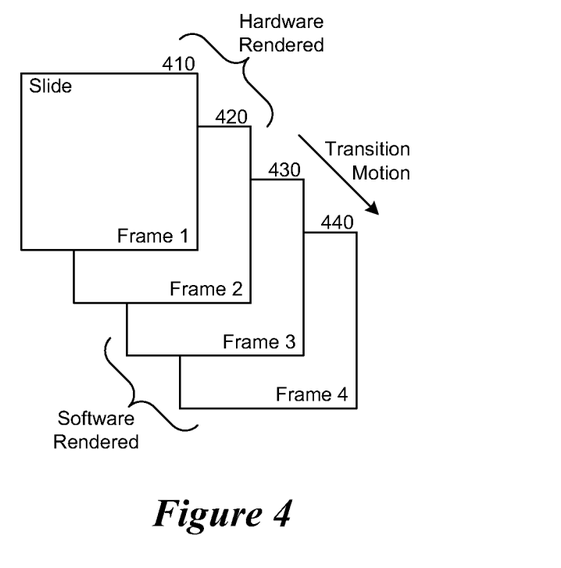
FIG. 4 is a display diagram that illustrates the transition from hardware to software rendering between frames displayed to the user, in one embodiment.

FIG. 4 is a display diagram that illustrates the transition from hardware to software rendering between frames displayed to the user, in one embodiment. FIG. 4 illustrates four slides in a slide presentation or frames of video in a movie that are displayed successively to the user. The frames may be displayed so quickly (e.g., 30 frames per second) such that the user perceives that the objects displayed in the frames are moving and cannot distinguish one frame from another. Frames 410 and 420 are displayed first and are rendered using hardware. During the rendering of frame 430, the variable rendering system encounters an error and switches to hardware rendering to re-render frame 430. The system then renders frame 440 using software rendering. The transition is fast enough (e.g., fractions of a second) that the user does not detect the switch and only sees the seamless presentation of slides or video that the user expects. Thus, the system allows the user to continue productive work with the application even though a hardware failure occurred.

In some embodiments, the variable rendering system copies content to system memory from video memory, even when using hardware rendering. Host applications often render their own content using APIs such as GDI/GDI+. It is not always possible to composite a surface suitable for hardware acceleration (e.g., a Microsoft DirectX surface) with a GDI surface. Operating systems such as Microsoft Windows Vista may increase this problem due to the new desktop window manager (DWM). By transferring images from video memory to system memory, the interaction of these applications with the render pipeline is not substantially different from before using the variable rendering system.

In some embodiments, applications use the variable rendering system for rendering to a printer. When an application creates documents or other displayed content with 3D objects, it is often easiest to render this content to a printer in the same way that it is rendered to a display device. Thus, the variable rendering system can be used for printing as well as display of content. The variable rendering system may use the same type of rendering (e.g., software or hardware) that is currently being used for the display when content is printed. This may allow the system to reuse certain 3D objects or textures and thereby conserve resources. If an event occurs that causes the rendering path to switch (e.g., from hardware to software) during the middle of printing the current object, the system will re-render the object with the new rendering path and then subsequent objects will be rendered with the new rendering path. In some cases, the system may switch to software rendering for all printing then back to hardware after print spooling completes. Printing can be a long operation and switching to software rendering from the outset can avoid possible interruptions, such as when a user locks the desktop and thereby causes hardware acceleration to fail.

In some embodiments, the variable rendering system informs the user of the current rendering path the system is using and when the rendering path changes. One reason to inform the user of rendering path switches is for applications that have functionality that is not available using software rendering. For example, certain animations/effects may work differently in hardware than in software (e.g., 3D motion paths) and the video playback experience may be altered. The system may display a toast-style notification in the taskbar or other suitable notification to inform the user. The system may also notify the user when the user is viewing a document or other content that was designed to use hardware acceleration if the user does not have hardware acceleration available.

From the foregoing, it will be appreciated that specific embodiments of the variable rendering system have been described herein for purposes of illustration, but that various modifications may be made without deviating from the spirit and scope of the invention. For example, although certain instances of rendering have been described, such as documents containing 3D objects, the system can be used wherever applications can use software or hardware-based rendering. Accordingly, the invention is not limited except as by the appended claims.

We claim:

1. A computer-implemented method for switching between software-based rendering and hardware-accelerated rendering in an application, the method comprising:
   determining that hardware-accelerated rendering is available;
   rendering application data using hardware-accelerated rendering;
   receiving an indication that hardware-accelerated rendering is no longer available;
   switching to software-based rendering without causing a stoppage in the ongoing use of the application.

2. The method of claim 1 wherein determining that hardware-accelerated rendering is available comprises determining that a user-modifiable configuration setting indicates that hardware-accelerated rendering is enabled.

3. The method of claim 1 wherein determining that hardware-accelerated rendering is available comprises determining that a computer system on which the application is running satisfies threshold hardware requirements.

4. The method of claim 1 wherein rendering application data using hardware-accelerated rendering comprises using a graphics processing unit to render objects.

5. The method of claim 1 wherein rendering application data using hardware-accelerated rendering comprises using a vertex shader to render a graphical object.

6. The method of claim 1 wherein rendering application data using hardware-accelerated rendering comprises using a pixel shader to render a graphical object.

7. The method of claim 1 wherein receiving an indication that hardware-accelerated rendering is no longer available comprises detecting a runtime failure in response to calling a graphics API.

8. The method of claim 1 wherein receiving an indication that hardware-accelerated rendering is no longer available comprises determining that the user locked a computer system on which the application is running.

9. The method of claim 1 wherein receiving an indication that hardware-accelerated rendering is no longer available comprises determining that the user accessed the application through a remote terminal.

10. The method of claim 1 wherein rendering includes displaying graphical objects to the user and sending a representation of the graphical objects to a printer.

11. A computer system for providing variable hardware-accelerated and software-accelerated rendering to an application, the system comprising:
    a hardware rendering component configured to render objects using hardware-accelerated rendering;
    a hardware loss detection component configured to detect errors that occur while rendering objects using hardware-accelerated rendering and transition the system from using hardware-accelerated rendering to using software-accelerated rendering;
    a software rendering component configured to render objects using software-accelerated rendering; and
    a retry hardware component configured to determine when a trigger occurs, and when the trigger occurs attempt to transition the system from using software-accelerated rendering to using hardware-accelerated rendering without stopping the application.

12. The system of claim 11 further comprising a configuration component configured to manage configuration of the system, wherein managing configuration of the system comprises detecting whether a user has disabled hardware-accelerated rendering and determining if a computer system meets hardware requirements for satisfactorily using hardware-accelerated rendering.

13. The system of claim 11 further comprising an initialization component configured to initialize hardware and software involved with hardware-accelerated rendering and provide a notification when the hardware is available for hardware-accelerated rendering.

14. The system of claim 11 wherein the hardware loss detection component is further configured to switch the system to software rendering when an error is detected.

15. The system of claim 14 wherein the error is selected from the group consisting of using an unsupported feature of the hardware, accessing a lost device, receiving a hardware error, and receiving a driver error.

16. The system of claim 11 wherein the hardware rendering component renders objects using the Microsoft Direct3D API or OpenGL.

17. A computer-readable storage medium encoded with instructions for controlling a computer system to transition rendering of an application from software-based rendering to hardware-based rendering, by a method comprising:
    rendering application data using software-based rendering;
    determining whether a trigger has occurred that signals that hardware rendering is likely to succeed;
    when the trigger occurs, attempting to render application data using hardware-based rendering; and
    if hardware-based rendering succeeds, automatically transitioning from software-based rendering to hardware-based rendering in ongoing use without stopping the application.

18. The computer-readable medium of claim 17 wherein the trigger is a notification that a user unlocked the computer system.

19. The computer-readable medium of claim 17 wherein the trigger is a notification that the user requested to play an animation.

20. The computer-readable medium of claim 17 wherein the trigger is a notification that a user logged on to a local session at the computer system.

* * * * *